United States Patent
Hodson et al.

[11] Patent Number: 5,730,430
[45] Date of Patent: Mar. 24, 1998

[54] SPRING UNIT FOR USE IN A PIVOT PIN ASSEMBLY

[75] Inventors: Raymond William Hodson, Fall Creek, Oreg.; Kelly G. Fehr, Burlington, Ky.; Christopher D. Wyckoff, Independence, Ky.; Michael R. Feldman, Taylor Mill, Ky.

[73] Assignee: ESCO Corporation, Portland, Oreg.

[21] Appl. No.: 561,529

[22] Filed: Nov. 21, 1995

Related U.S. Application Data

[63] Continuation-in-part of Ser. No. 200,431, Feb. 23, 1994, abandoned.

[51] Int. Cl.$^6$ ................................................ F16F 1/20
[52] U.S. Cl. ................................................ 267/162
[58] Field of Search ........................... 267/160, 161, 267/162, 37.2, 14

[56] References Cited

U.S. PATENT DOCUMENTS

| | | | |
|---|---|---|---|
| 2,162,719 | 6/1939 | Hay | 267/162 |
| 2,912,564 | 11/1959 | Deffenbaugh et al. | 267/162 X |
| 2,973,015 | 2/1961 | Thompson | 267/162 X |
| 3,037,734 | 6/1962 | Coyle . | |
| 3,980,016 | 9/1976 | Taylor | 267/162 |
| 4,099,761 | 7/1978 | Cullings . | |
| 4,181,343 | 1/1980 | Lindqvist . | |
| 4,239,273 | 12/1980 | Dodemont et al. . | |
| 4,335,914 | 6/1982 | Korbel . | |
| 4,379,675 | 4/1983 | Muntjanoff et al. . | |
| 4,382,624 | 5/1983 | Lysenko . | |
| 4,417,759 | 11/1983 | Pierrot, III et al. . | |
| 4,553,778 | 11/1985 | Tyer . | |
| 4,573,728 | 3/1986 | Johnson . | |
| 4,679,839 | 7/1987 | Damron . | |
| 4,715,641 | 12/1987 | Palmer . | |
| 4,717,191 | 1/1988 | Farmer . | |
| 4,743,055 | 5/1988 | Dantan . | |
| 4,810,020 | 3/1989 | Powell . | |
| 5,096,247 | 3/1992 | Killen . | |
| 5,110,169 | 5/1992 | Shepherd et al. . | |

FOREIGN PATENT DOCUMENTS

| | | | |
|---|---|---|---|
| 2496072 | 6/1982 | France . | |
| 2852463 | 6/1979 | Germany . | |
| 3703901 | 8/1988 | Germany . | |
| 1174629 | 8/1985 | U.S.S.R. | 267/162 |
| 1214510 | 2/1986 | U.S.S.R. . | |

OTHER PUBLICATIONS

Drawing titled "Snubber Assembly (100" Grapple Head)", Jul. 1985.
Drawing titled "Grease Adjusted Snubber Assembly", SNB 3000, 1988.

*Primary Examiner*—Lee W. Young
*Attorney, Agent, or Firm*—Banner & Witcoff, Ltd.

[57] ABSTRACT

A spring unit for installation in a pivot pin assembly. The spring unit including a pair of disc springs each with an axially centered aperture and each with, when in an uncompressed condition, a concave side and a convex side. A retaining element, such as an adhesive, retains the disc springs to a returning member such that the spring unit can be easily installed in the pin assembly as a unit. The spring unit further includes a centering structure whereby the disc springs can be centered about the pin assembly when fully compressed.

35 Claims, 3 Drawing Sheets

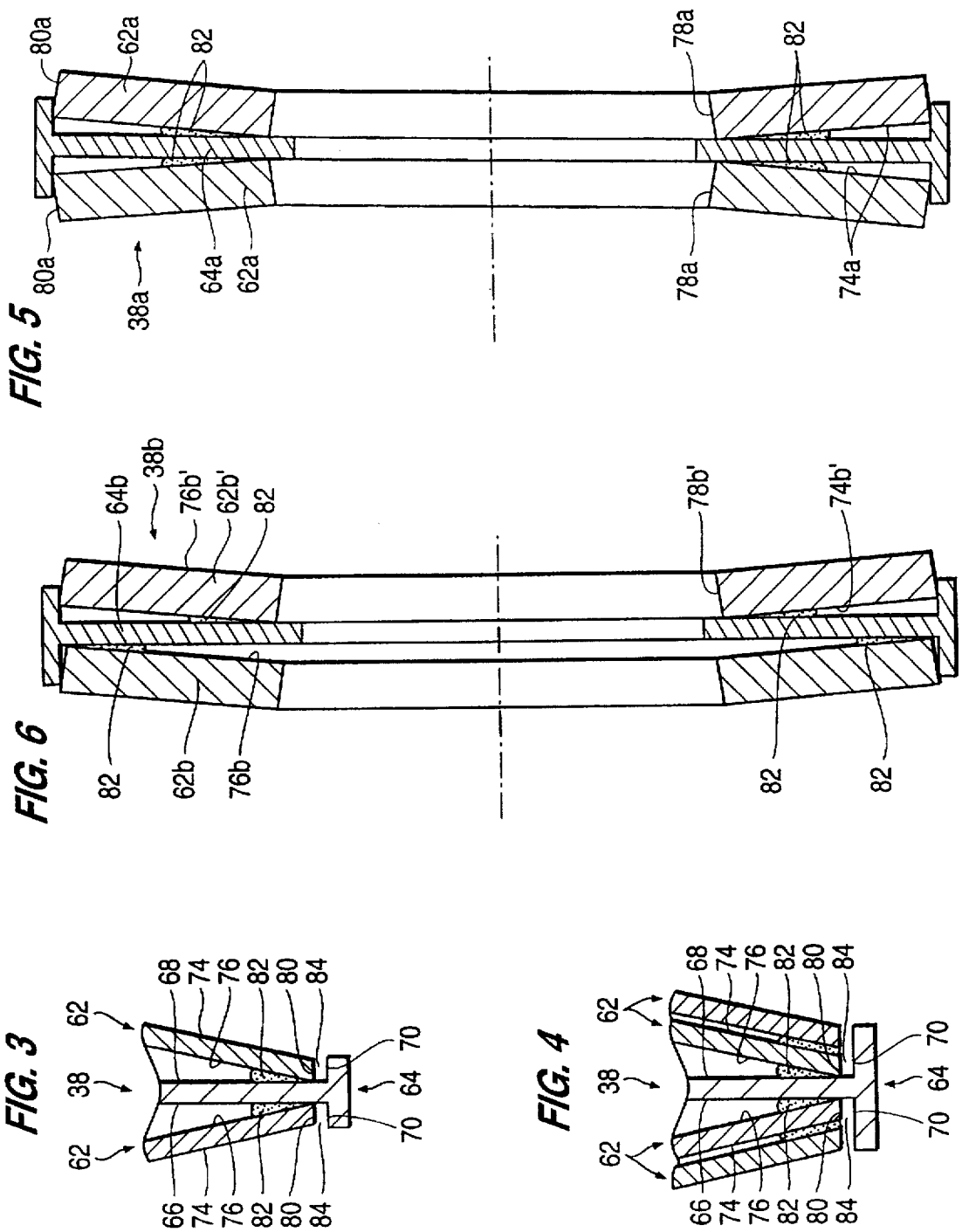

SPRING UNIT FOR USE IN A PIVOT PIN ASSEMBLY

This application is a continuation-in-part of U.S. patent application Ser. No. 08/200,431 filed Feb. 23, 1994, and now abandoned.

BACKGROUND OF THE INVENTION

1. Field of the Invention

The present invention relates to a spring unit for installation and use in a pivot pin assembly, such as the pivot pin assembly in a grapple snubber device. More particularly, the spring unit includes two disc springs and a spring retaining member combined for easy installation in the pivot pin assembly and to ensure the disc springs are approximately centered about a pivot pin.

2. Description of the Prior Art

In the skidding of logs, a vehicle is provided having a rearwardly extending boom from which is suspended a grapple. The grapple requires freedom of movement in two mutually perpendicular vertical planes. Movement is provided by a housing equipped with pivot pins connected to a boom clevis at the top and a grapple clevis at the bottom. However, when the grapple is free, it requires snubbing against free pivotable movement which could otherwise cause injury to logging personnel and possible damage to the grapple itself by crashing into the boom.

Various forms of snubber devices are known in the art. For example, co-owned U.S. Pat. Nos. 4,810,020 and 5,096,247, both of which are incorporated by reference herein, disclose snubber devices incorporating both a hydraulically actuated piston and disc or Belleville springs to apply force to friction discs to obtain the necessary snubbing action. In the snubber devices disclosed in these references, the hydraulic piston is used to ensure that sufficient pressure is applied to the friction discs even as the friction discs begin to wear away. The disc springs in the snubber devices of these references also provide some of the necessary pressure to the friction discs for an adequate snubbing action. However, the expansion of the disc springs from their compressed condition alone does not provide enough dampening force on the friction disc to take into account the entire wear life of the friction discs. Thus, the disc springs must be recompressed during the wear life of the friction discs by periodically pressurizing the hydraulic piston in the snubber link housing or periodically retightening the nut on the pivot pin to recompress the disc springs. Thus, the snubber device requires periodic, if not frequent, maintenance, in either the form of pressurizing the hydraulic piston or retightening the nut on the pivot pin, over the wear life of the friction discs in order to ensure that there is proper snubbing pressure on the friction discs. Thus, adjustments to the snubber device may be necessary at numerous times before the friction discs are worn out and ready to be replaced. Furthermore, the snubber devices discussed above have channels and passageways disposed within the snubber link housing. Such channels in the housing could possibly decrease the strength and integrity of the snubber housing.

Co-owned U.S. Pat. No. 4,717,191 discloses a snubber device having a pair of disc springs engaging one another such that their concave sides when in an uncompressed condition face one another. The disc springs are used to apply the snubbing force to the friction discs. The pair of springs include apertures which are positioned about the pivot pin. The disadvantage of the dual spring structure of this reference is that if the disc springs are not properly axially aligned about the pivot pin, the force exerted on the friction discs will be uneven, thus, resulting in uneven wear of the friction discs. Therefore, in order to ensure proper alignment of the disc springs, the diameter of the apertures of the disc springs should be substantially the same as the diameter of the pivot pin. As is apparent, this will require special manufacturing of disc springs with various sizes of apertures for each snubber device having a different pin diameter. Further, installation of the disc springs within the snubber device and about the pivot pin can result in misalignment of the disc springs because they are inserted as separate members. In other words, the assembly of the disc springs requires positioning of each of the disc springs about the pivot pin separately, thus resulting in possible misalignment of the disc springs with respect to one another as the springs are compressed by the tightening of the nut on the other end of the pivot pin. Still further, when installing the pair of disc springs disclosed in the above reference in field conditions, it is possible that the installer will incorrectly position the disc springs such that the convex side of one spring engages the concave side of the other instead of the concave sides of the springs facing one another.

As is apparent, there is a need in the art for a structure for allowing the easy addition of additional disc springs to a snubber device to apply proper snubbing force to the friction discs over the wear life of the friction discs such that the snubber device need rarely, if ever, be adjusted during the life of the friction discs. Further, none of the above described references discloses a structure for adding disc springs which ensures that the disc springs are properly aligned about the pivot pin of the snubber device even when the disc springs have apertures with a diameter larger than the diameter of the pivot pin or a structure for ensuring correct orientation of the disc springs with respect to each other. Still further, none of the above described references discloses a structure for easily installing additional springs as a single unit in a snubber device.

SUMMARY OF THE INVENTION

The present invention is directed to a spring unit for installation in a pivot pin assembly. The spring unit has a pair of disc springs with axially centered apertures. When the disc springs are in their uncompressed condition, each of the disc springs has a concave side and a convex side. The spring unit further includes means for retaining the pair of disc springs in substantial alignment with each other. The retaining means further includes means for securing the disc springs to the retaining means such that the combination of the retaining means and the disc springs can be easily installed in a pivot pin assembly as a unit. Additionally, the spring unit has means for centering each of the apertures of the disc springs about the pivot pin when the disc springs are in their compressed condition.

The retaining means of the present invention can include a disc member with an annular recess on each side in which are disposed the disc springs. The annular recesses can each have a peripheral rim which will engage the peripheral edges of the disc springs when the disc springs are compressed such that the engagement will provide the centering of the disc springs about the pivot pin.

The present invention provides the advantage of the ability to easily install additional disc springs into a snubber device such that adequate snubbing pressure can be applied to the friction discs of the snubbing device during the entire life of the friction discs with minimal maintenance. Further, the present invention ensures that disc springs with axially centered apertures of a size different than that of the pivot pin on which they are ensleeved will be properly centered about the pivot pin to apply a uniform force to the friction discs of the snubber device. Thus, a standard disc spring with a standard size aperture can be used with a variety of different size pins. Furthermore, the present invention provides for the installation of two springs as a single unit such that they can be easily handled during insertion in a snubber device and such that the disc spring will be in proper alignment and oriented correctly even when installation occurs in the field. Still furthermore, the manner of attaching the disc springs together does not interfere with their compression or expansion during the operation of the snubber device.

BRIEF DESCRIPTION OF THE DRAWINGS

FIG. 3 is a partial sectional view of a lower portion of one of the spring units of FIG. 2 showing the position of the adhesive layer used to secure the disc springs to the spring retainer.

FIG. 4 is a partial sectional view of an alternative spring unit of the present invention.

FIG. 5 is a sectional view of another alternative spring unit of the present invention.

FIG. 6 is a sectional view of another alternative spring unit of the present invention.

DETAILED DESCRIPTION OF THE PREFERRED EMBODIMENTS

Figure 1:
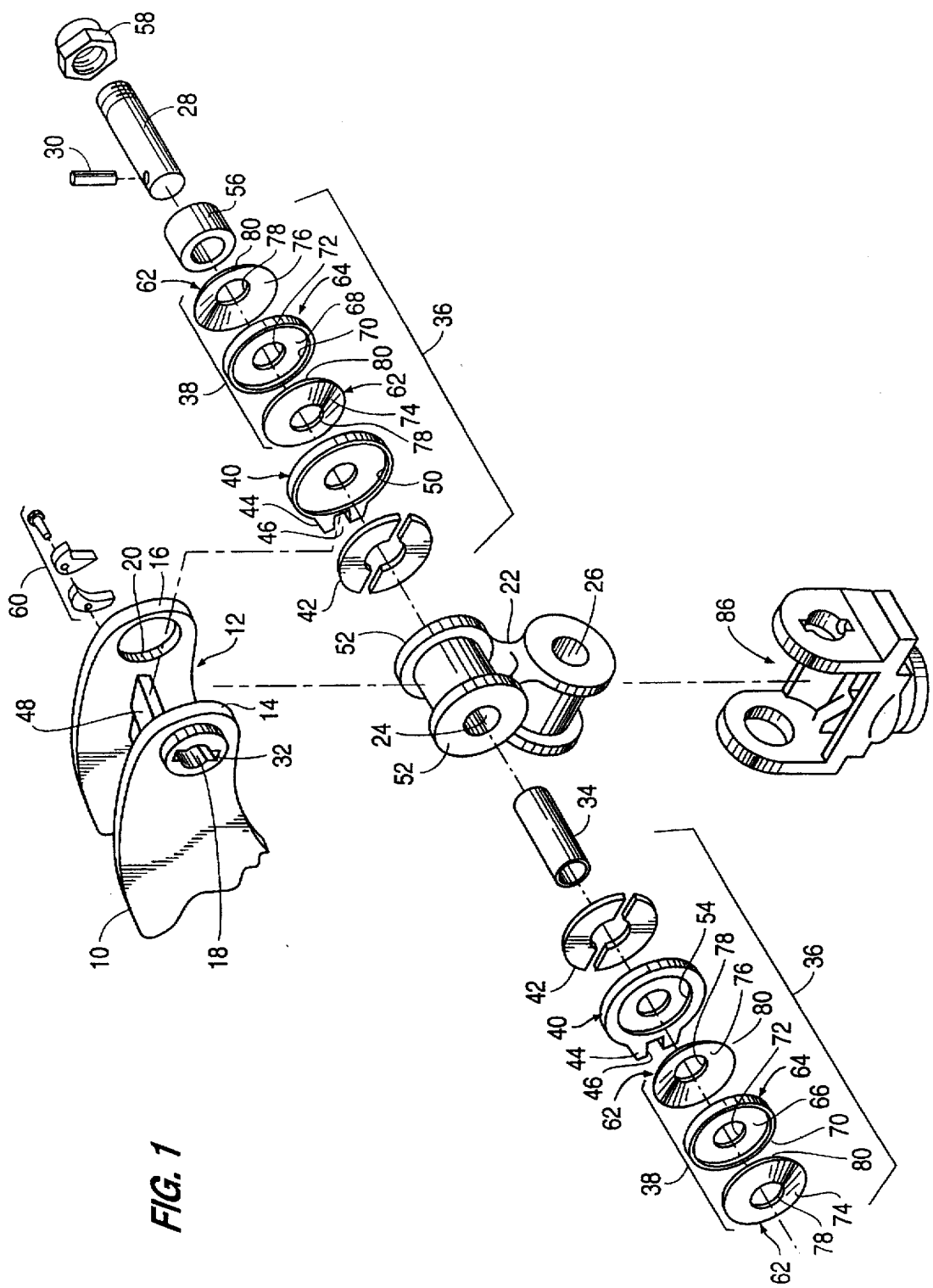
FIG. 1 is an exploded perspective view of a snubber device including the spring unit of the present invention.
Figure 2:
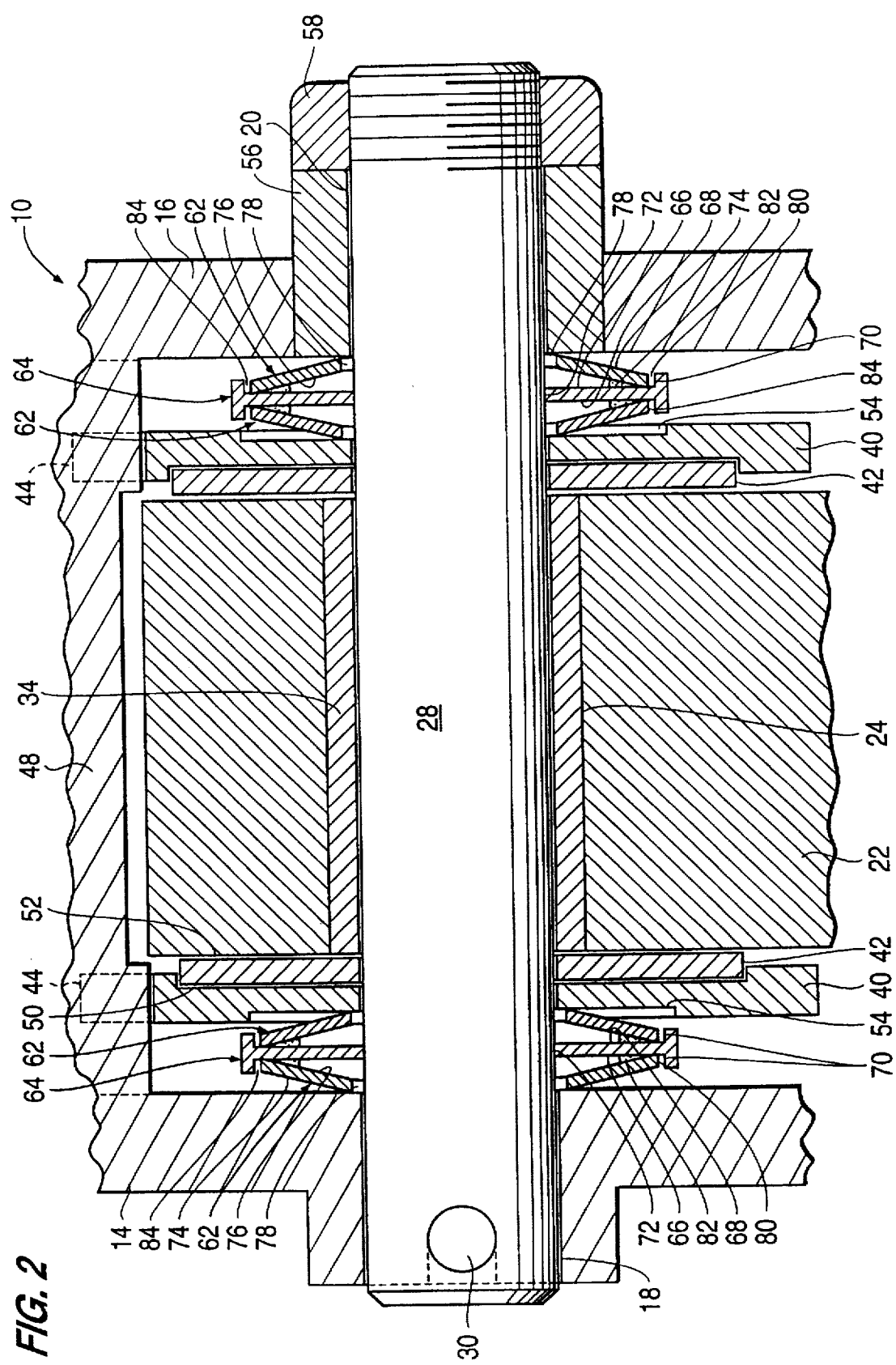
FIG. 2 is a longitudinal sectional view taken generally in a horizontal plane of the assembled structure of FIG. 1 and showing two of the spring units of the present invention ensleeved about a pivot pin and in an uncompressed condition.

With reference to FIGS. 1 and 2, boom 10 is shown having clevis 12 with arms 14 and 16 having axial bores 18 and 20, respectively. Link housing 22 is provided with through bores 24 and 26 oriented such that they are perpendicular to one another.

With particular reference to FIG. 2, when the snubber device is assembled, link housing 22 is positioned in clevis 12 such that bores 18 and 20 are aligned with upper bore 24 of link housing 22. Pivot pin or shaft 28 is positioned through bores 18, 20, and 24 to allow pivotable movement of link housing 22 with respect to boom 10. Pivot pin 28 is prevented from moving to the right in FIG. 2 by holding pin 30 which is positioned through an aperture in pivot pin 28 and engages the outside surface of clevis arm 14. Holding pin 30 is positioned in countersunk opening 32 on the outside surface of clevis arm 14 to prevent rotation of pivot pin 28. Positioned around pivot pin 28 and in between pivot pin 28 and bore 24 is wear bushing 34. Various other components which provide the snubbing action are positioned around pivot pin 28 as will be more fully described below.

Proceeding from the inside surface of left clevis arm 14 and moving inwards towards the link housing 22, snubber assembly 36 includes spring unit assembly 38, disc retainer 40 and split friction disc 42. These elements are ensleeved on pivot pin 28 with appropriately centered apertures. Disc retainer 40 is provided with integral protrusion 44 which has channel 46 disposed therein. Channel 46 engages boom cross bar 48 to prevent rotation of disc retainer 40. Disc retainer 40 further has countersunk annular recess 50 for receipt of split friction disc 42. As can be appreciated from FIG. 2, split friction disc 42 wears against recess 50 of disc retainer 40 and wear surface 52 of link housing 22. Disc retainer 40 further can have countersunk annular recess 54 on the side opposite recess 50 for providing a smooth bearing surface for spring unit assembly 38 and for reducing the thickness of snubber assembly 36.

An identical snubber assembly 36 is provided in between link housing 22 and right clevis arm 16, as can be appreciated from a consideration of the right-hand portions of FIGS. 1 and 2. Completing the right-hand portion of the assembly on pivot pin 28 is tension spacer 56 which abuts against right-hand spring unit assembly 38 and nut 58 which is threadably received on the right-hand end of pivot pin 28. Further, nut locking mechanism 60 can be provided and is positioned on right clevis arm 16.

With reference to FIGS. 1-3, the construction of spring unit assembly 38 will be specifically described. Spring unit assembly 38 includes a pair of disc or Belleville springs 62 and disc spring retainer 64.

Disc spring retainer 64 has two countersunk annular recesses 66 and 68 positioned on opposite sides. Annular recesses 66 and 68 each have annular peripheral rim 70. Disc spring retainer 64 further has axially centered aperture 72 which is dimensioned with a diameter that is approximately the same as the diameter of pivot pin 28 such that disc spring retainer 64 can be maintained in axial alignment with pivot pin 28 when it is disposed thereon. Annular recesses 66 and 68 can be preformed with disc spring retainer 64 or can be later milled into disc spring retainer 64 by any suitable means. Each of disc springs 62 has convex side 74 and concave side 76 when it is in its uncompressed condition or state as shown in FIGS. 1-3. Each disc spring 62 also have axially centered aperture 78 and peripheral edge 80.

Although FIG. 1 shows disc springs 62 and disc spring retainers 64 as separate components for the sake of clarity, a pair of disc springs 62 are secured to one disc spring retainer 64 for installation in the snubber assembly such that they can easily be positioned as a unit in the proper position along pivot pin 28. More particularly, with reference to FIGS. 2 and 3, one disc spring 62 is positioned on one side of the disc spring retainer 64 in annular recess 66 and the other disc spring 62 is positioned on the other side of disc spring retainer 64 in annular recess 68. The pair of disc springs 62 are oriented such that their concave sides 76 face one another and face inward towards disc spring retainer 64.

Disc springs 62 and disc spring retainer 64 are held together as a unit by adhesive layer 82. Adhesive layer 82 is applied in between disc spring retainer 64 and concave side 76 of each disc spring 62. Adhesive layer 82 can be applied to either disc spring retainer 64 or the periphery of disc springs 62 during the assembly of spring unit 38. Further, adhesive layer 82 can have various configurations, for example, it can be applied as an annular ring adjacent the peripheral edge 80 of the disc spring 62 or it can be applied at various spot locations also adjacent peripheral edge 80 of disc spring 62. Adhesive layer 82 performs the advantageous function of maintaining disc springs 62 and disc spring retainer 64 as a single unit prior to and during installation in the snubber assembly. Furthermore, adhesive layer 82 is of such a nature that it is sufficient to hold spring unit 38 together during assembly, but does not substantially interfere with or substantially inhibit the compression or expansion of disc springs 62, such as will be described below. A preferable type of adhesive for use as adhesive layer 82 is silicone rubber which is a flexible, pliable general purpose sealant and adhesive, for example silicone rubber made by Dow Corning Corp. and marketed under the trademark DAP® by Dap, Inc., Home Products Division of Schering-Plough, Dayton, Ohio and identified by catalog #8641 is suitable. As is apparent, a mechanical structure can be substituted for adhesive layer 82 so long as the mechanical structure secures disc springs 62 to spring retainer 64 such that the mechanical structure does not substantially interfere with the compression or expansion of disc springs 62. For example, spring retainer 64 could be provided with a suitable ledge or possibly a clip structure to secure disc springs 62.

When spring unit 38 is assembled prior to installation, disc springs 62 are positioned and adhesively attached in respective annular recesses 66 and 68 such that an annular gap 84 is created in between each peripheral rim 70 of disc retainer 64 and peripheral edge 80 of the respective disc spring 62. Furthermore, with reference to FIG. 2, aperture 78 in disc spring 62 will often be of a larger diameter size than the diameter size of pivot pin 28. This is because it is usually costly to make disc springs with the same particular diameter size as the pivot pin and less expensive to make disc springs with one standard size aperture large enough to fit most potential pivot pins. Thus, as will be more fully described below, spring unit 38 allows the use of standard disc springs 62 with standard size apertures 78 on numerous different sizes of pivot pins 28 such that the standard disc springs will be adequately centered about the pivot pin.

Although, in the description above, spring unit 38 is described as having one disc spring 62 disposed in annular recess 66 of spring retainer 64 and one disc spring 62 disposed in annular recess 68 of spring retainer 64, as is apparent, additional disc springs can be stacked with each of disc springs 62 disposed in annular recessed 66 and 68. In other words, the width of each peripheral rim 70 of annular recesses 66 and 68 could be increased such that two or more disc springs 62 stacked convex side to concave side could be positioned in annular recess 66 and two or more disc springs 62 stacked convex side to concave side could be positioned in annular recess 68 (FIG. 4).

In the preferred embodiment of the spring unit 38a, a pair of disc springs 62a are secured to a spring retainer 64a such that the convex sides 74a face inward toward one another (FIG. 5). In this arrangement, the peripheral edge 80a of the inner disc spring 62a presses against the disc retainer 40. As can be appreciated, the peripheral edge 80a of disc spring 62a of spring unit 38a provides a broader engagement with disc retainer 40 then does the convex face 74 of disc spring 62 of spring unit 38. The broader engagement provided by this disc spring 62a is able to better prevent undesired distortion of the disc retainer when the assembly is tightened. A properly positioned disc retainer 40 is important for placing even loads on friction discs 42 and thereby maximizing the usable life of the friction discs.

In an alternative embodiment, a spring unit 38b includes disc springs 62b, 62b' which are oriented such that their concave sides 76b, 76b' face in the same direction. In this construction, the concave side 76b of disc spring 62b and the convex side 74b' of disc spring 62b' face inward toward spring retainer 64b. In use, spring unit 38b would preferably be installed in the pin assembly so that disc spring 62b' pressed against disc retainer 40 in order to provide a broader engagement area.

In the same way as discussed for spring unit 38, disc springs 62a, 62b, 62b' are secured to disc retainers 64a, 64b via an adhesive or mechanical means; although the use of an adhesive is preferred. As seen in FIGS. 5 and 6, adhesive 82 is applied near apertures 78a, 78b' for disc springs 62a, 62b' which are oriented with their convex sides 74a, 74b' against spring retainers 64a, 64b. With respect to spring unit 38b, adhesive 82 is applied near peripheral edge 80 of disc spring 62b. Spring units 38a, 38b are used in the pin assembly in the same way as described for spring units 38. Finally, a plurality of stacked disc springs 62 could be provided on one or both sides of disc retainers 64a, 64b, in the same manner as discussed for spring unit 38 (FIG. 4).

With reference to FIGS. 2 and 3, the compression of spring units 38 in the snubber assembly will be described. FIG. 2 shows the snubber assembly in an assembled but untensioned position such that disc springs 62 in spring units 38 are not compressed. As nut 58 is tightened, tension spacer 56 is moved to the left in FIG. 2 such that both pairs of disc springs 62 are compressed in their respective spring units. When disc springs 62 are in their fully compressed state, they will be substantially planar, or in other words, they will no longer have concave or convex sides. As each of the disc springs 62 is compressed, peripheral edge 80 of each disc spring 62 moves outward tending to eliminate annular gaps 84. As each peripheral edge 80 of disc springs 62 engages peripheral rim 70 of the respective annular recesses of disc retainers 64, each disc spring is axially centered about pivot pin 28. More particularly, as described above, aperture 72 of disc spring retainer 64 has a diameter that is substantially the same size as the diameter of pivot pin 28. Thus, as peripheral edge 80 of disc spring 62 engages peripheral rim 70, disc spring 62 will be centered about pivot pin 28 no matter what the diameter of the aperture in disc spring 62. As is apparent, annular recesses 66 and 68 in spring retainer 64 have a diameter that is substantially the same as the diameter of peripheral edge 80 of a completely collapsed or compressed disc spring 62. Such an arrangement ensures that disc springs 62 are properly centered about pivot pin 28. Further, as described above, adhesive layer 82 is formed of a suitable adhesive which allows peripheral edge 80 of disc spring 62 to expand when disc spring 62 is compressed. Additionally, the adhesive does not interfere with disc spring 62 when it expands due to wear in friction discs 42.

When disc springs 62 in spring units 38 are fully collapsed, sufficient pressure is supplied to each disc retainer 40 and thus to each friction disc 42 to snub or prevent pivotal motion about pivot pin 28 when the grapple suspended from the boom is not loaded. As friction discs 42 begin to wear, disc springs 62 in spring units 38 expand, thus, still exerting sufficient snubbing pressure on friction discs 42. By combining two disc springs 62 in each spring unit 38, additional spring travel along pivot pin 28 is obtained such that it may be unnecessary to re-tighten nut 58 for compressing the disc springs during the entire life of friction discs 42. In other words, by providing disc springs 62 in pairs such that their concave sides 76 face one another, discs springs 62 will provide sufficient snubbing force to friction discs 42 over possibly the entire wear life of friction discs 42 because of the expansion or "travel" of disc springs 62 along pivot pin 28. Thus, the ease with which spring units 38 allow the addition of additional spring travel with sufficient snubbing force may eliminate the need to conduct maintenance on the snubber assembly during the wear life of the friction discs. Further, the provision of the additional springs may reduce the need for additional snubber structures, for example a hydraulic piston, thus, simplifying the snubber assembly and possibly increasing the strength of the link housing because it is no longer necessary to provide passages or cavities therein.

As described above, spring units 38 ensure that disc springs 62 are properly centered about pivot pin 28. This fact is advantageous for the reason that if disc springs 62 are not properly aligned, friction discs 42 will not wear evenly because the force of compressed disc springs 62 will not be applied evenly. Thus, the centering function of spring units 38 provides the advantageous feature of ensuring that friction discs 42 wear evenly.

By combining a pair of disc springs 62 with disc spring retainer 64 in a spring unit 38 prior to installation in a snubber assembly, the installation of the disc springs in the assembly is greatly simplified. Instead of having numerous components of differing shapes and/or orientations, one unit can be easily inserted at the proper position in the snubber assembly. Further, if disc springs 62 were inserted without disc spring retainer 64, it would be unlikely that disc springs 62 would properly bear upon one another to provide an even force to friction discs 42. Further, it would be unlikely that disc springs 62 would be appropriately centered about pivot pin 28 especially if apertures 78 of disc springs 62 had a larger diameter than that of the pivot pin. Additionally, assembling disc springs 62 as a single spring unit 38 ensures that disc springs 62 are positioned such that their concave sides face one another even when the snubber assembly is assembled in a field or working environment. This concave to concave orientation is important to supply additional spring travel to the snubber assembly with the correct amount of snubbing force. Thus, the present invention of the spring unit allows the use of standard size disc springs with standard size apertures therein in combination with a spring retainer having an aperture corresponding to the pin size.

As is apparent from the above discussion, spring unit 38 need not be positioned at the exact locations shown in FIGS. 1 and 2. For example, spring unit 38 could be positioned along a pivot pin outside of any one of the boom clevis arms 14 or 16 so long as the spring unit is properly compressed by the torquing action of the nut on the pivot pin.

With reference to FIG. 1, the pivot pin and snubber assemblies of the connection between clevis 12 of boom 10 and bore 24 of link housing 22 has been described. As is apparent, a pivot pin and snubber assembly identical to the one described above can be used to pivotally attach grapple clevis 86 to bore 26 of link housing 22.

Although spring unit 38 is described above as being used in a snubber assembly for a grapple, it is apparent that spring unit 38 can be used in other pivot pin assemblies wherein tension or compression is desired to be applied to components or structures along a pin.

It will be understood that variations and changes in the details, materials, and arrangement of the parts, which have been herein described and illustrated in order to explain the nature of the invention, may be made by those skilled in the art within the principles and scope of the invention. What is sought to be protected herein is as recited in the appended claims.

We claim:

1. A spring unit for installation in a pin assembly comprising:

a first disc spring having an axially centered aperture and, when in an uncompressed condition, a convex side and a concave side;

a second disc spring having an axially centered aperture and, when in an uncompressed condition, a convex side and a concave side;

a spring retaining member having an axially centered aperture, and first and second oppositely facing sides extending generally transverse to the axis of said aperture of said spring retaining member, each of said first and second sides having a recess formed therein, each of said recesses having a peripheral rim;

wherein said first disc spring is positioned in said recess on said first side of said spring retaining member and said second disc spring is positioned in said recess on said second side of said spring retaining member; and an adhesive positioned in between each of said disc springs and said respective recesses such that each of said disc springs is attached to said respective sides of said spring retaining member to allow easy installation of the spring unit in the pivot pin assembly, said adhesive allowing said disc springs to be compressed such that in their compressed condition said apertures of said disc springs are centered with respect to said aperture of said spring retaining member by contacting said respective peripheral rims of said recesses.

2. The spring unit of claim 1, wherein each of said apertures of said disc springs has a diameter greater than the diameter of said aperture of said spring retaining member.

3. The spring unit of claim 1, wherein said adhesive is positioned in between each of said disc springs and said respective recesses at discreet locations.

4. The spring unit of claim 1, wherein said adhesive is positioned in between each of said disc springs and said respective recesses in a continuous layer adjacent the peripheries of each said disc spring.

5. The spring unit of claim 1, wherein said spring retaining member has a generally planar disc shape.

6. The spring unit of claim 1, wherein an additional disc spring is stacked with at least one of said first and second disc springs.

7. The spring unit of claim 1, wherein said convex side of at least one said disc spring faces said spring retaining member.

8. The spring unit of claim 1, wherein said concave side of at least one disc spring faces said spring retaining member.

9. The spring unit of claim 1, wherein said convex side of each said disc spring faces said spring retaining member.

10. A spring unit for installation in a pin assembly comprising:

a retaining member having a central aperture and a pair of opposite sides;

a plurality of disc springs each having a central aperture and, in an uncompressed condition, a concave side and a convex side, at least one disc spring engaging each said side of said retaining member; and an adhesive for securing said disc springs to said retaining member to form an integral unit for easy installation over a pin in a pin assembly, said adhesive securing said disc springs so as to permit said disc springs to flex and be simultaneously compressed toward said retaining member.

11. The spring unit of claim 10, wherein each of said apertures of said disc springs has a diameter greater than the diameter of said aperture of said spring retainer.

12. The spring unit of claim 10, wherein said adhesive is positioned in between each said disc springs and said respective recesses at discreet locations.

13. The spring unit of claim 10, wherein said adhesive is positioned in between each said disc springs and said respective recesses in a continuous layer adjacent the peripheries of each said disc spring.

14. The spring unit of claim 10, wherein said spring retaining member has a generally planar disc shape.

15. The spring unit of claim 10, wherein said retaining member further includes an abutment structure which centers each said disc spring relative to said central aperture of said retaining member so as to be adapted to be centered about a pin of a pin assembly when said disc springs are compressed.

16. The spring unit of claim 15, wherein said abutment structure is defined by a recess formed in each said side of said retaining member.

17. The spring unit of claim 16, wherein said recesses and said disc springs have transverse dimensions which are substantially the same when said disc springs are fully compressed.

18. A spring unit for installation in a pin assembly comprising:

a plurality of disc springs each having a central aperture and, in an uncompressed condition, a concave side and a convex side;

a retaining member having a central aperture about an axis and a pair of opposite sides generally extending in directions perpendicular to said axis wherein at least one disc spring engages each said side of said retaining member, and each said side includes at least one abutment for positioning said disc springs; and at least one retaining element for securing said disc springs to said retaining member to form an integral unit for easy installation over a pin in a pin assembly, said retaining elements securing said disc springs such that said disc springs are permitted to flex and be simultaneously compressed toward said retaining member, and so that at least one disc spring extends outward at least as far as each said side in a direction generally parallel to said axis when fully compressed.

19. The spring unit of claim 18, wherein a plurality of retaining elements are provided at discrete locations around each said disc spring.

20. The spring unit of claim 19, wherein said retaining elements are beads of adhesive.

21. The spring unit of claim 18, wherein said at least one retaining element includes an adhesive between said retaining member and said disc springs.

22. The spring unit of claim 18, wherein an additional disc spring is stacked upon at least one of said disc springs.

23. The spring unit of claim 18, wherein said convex side of at least one of said disc springs engages said retaining member.

24. The spring unit of claim 18, wherein said concave side of at least one of said disc springs engages said retaining member.

25. The spring unit of claim 18, wherein said convex side of each said disc spring faces said retaining disc.

26. The spring unit of claim 18, wherein said at least one retaining element includes adhesive positioned between said disc springs and said retaining member.

27. A spring unit for installation in a pin assembly comprising:

a single retaining member having a central aperture and a pair of opposite sides;

a plurality of disc springs each having a central aperture, an outer edge, and, in an uncompressed condition, a concave side and a convex side, at least one of said disc springs engaging each said side of said retaining member, and at least one of said disc springs having a free unconnected outer edge extending outward so as to be adapted to engage against an adjacent part in an unsecured manner; and at least one retaining element for attaching said disc springs to said retaining member in general axial alignment such that there are no disc springs attached to said retaining element which are not in general axial alignment as so form an integral unit for easy installation over a pin in a pin assembly, said retaining element securing said disc springs so as to permit said disc springs to flex and be simultaneously compressed toward said retaining member.

28. The spring unit of claim 27, further including means for centering said apertures of said disc spring relative to the central aperture of said retaining member when said disc springs are in a compressed condition so as to be centered about the pin of said pin assembly.

29. The spring unit of claim 27, wherein said at least one retaining element includes an adhesive positioned between said disc springs and said retaining member.

30. The spring unit of claim 27, wherein said convex side of at least one said disc spring engages said retaining member.

31. The spring unit of claim 27, wherein said concave side of at least one said disc spring engages said retaining member.

32. The spring unit of claim 27, wherein said convex side of each said disc spring faces said retaining member.

33. The spring unit of claim 27, wherein said at least one retaining element includes adhesive positioned between said disc springs and said retaining member.

34. A spring unit for installation in a pin assembly consisting essentially of:

a retaining member having a central aperture and a pair of opposite sides;

a plurality of disc springs each having a central aperture and, in an uncompressed condition, a concave side and a convex side, at least one disc spring engaging each said side of said retaining member; and at least one retaining element for attaching said disc springs to said retaining member in general axial alignment to form an integral unit for easy installation over a pin in a pin assembly, said retaining element securing said disc springs so as to permit said disc springs to flex and be simultaneously compressed toward said retaining member.

35. The spring unit of claim 34, wherein said at least one retaining element includes adhesive positioned between said disc springs and said retaining member.

* * * * *